United States Patent
Lim et al.

(10) Patent No.: US 9,584,362 B2
(45) Date of Patent: Feb. 28, 2017

(54) METHOD AND APPARATUS FOR ESTABLISHING ROUTING PATH IN MULTI-HOP NETWORK

(71) Applicant: Ajou University Industry-Academic Cooperation Foundation, Suwon, Gyeonggi-Do (KR)

(72) Inventors: Jae Sung Lim, Gyeonggi-Do (KR); Jae Joon Lee, Gyeonggi-Do (KR)

(73) Assignee: Ajou University Industry-Academic Cooperation, Suwon, Gyeonggi-do (KR)

(*) Notice: Subject to any disclaimer, the term of this patent is extended or adjusted under 35 U.S.C. 154(b) by 1 day.

(21) Appl. No.: 13/739,883

(22) Filed: Jan. 11, 2013

(65) Prior Publication Data

US 2013/0188475 A1    Jul. 25, 2013

Related U.S. Application Data

(63) Continuation of application No. PCT/KR2011/005105, filed on Jul. 12, 2011.

(30) Foreign Application Priority Data

Jul. 12, 2010    (KR) .................. 10-2010-0066696

(51) Int. Cl.
| | |
|---|---|
| *H04L 12/26* | (2006.01) |
| *H04L 12/24* | (2006.01) |
| *H04W 40/02* | (2009.01) |
| *H04W 40/34* | (2009.01) |
| *H04L 12/703* | (2013.01) |

(52) U.S. Cl.
CPC ....... *H04L 41/0659* (2013.01); *H04W 40/026* (2013.01); *H04W 40/34* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 6,282,170 B1 * | 8/2001 | Bentall et al. | ........... 370/225 |
| 7,068,600 B2 | 6/2006 | Cain | |
| 7,263,063 B2 | 8/2007 | Sastry et al. | |

(Continued)

FOREIGN PATENT DOCUMENTS

| | | |
|---|---|---|
| KR | 10-0516121 B1 | 9/2005 |
| KR | 10-0659351 B1 | 12/2006 |

*Primary Examiner* — Zewdu A Beyen
(74) *Attorney, Agent, or Firm* — Mintz Levin Cohn Ferris Glovsky and Popeo, P.C.; Kongsik Kim; Jonathon Western (57) ABSTRACT

The present invention relates to methods and apparatuses for establishing a routing path in a multi-hop network. The methods comprises (a) transmitting a notification message associated with communication problem to neighboring nodes, (b) deriving approaching characteristics of a communication problem-causing element from the notification message, and (c) establishing a routing path based on the approaching characteristics of the communication problem-causing element. With the methods and apparatuses, it is possible to determine a path that is expected to experience a communication problem based on the approaching characteristics of a communication problem-causing element and to adaptively establish a reliable routing path.

9 Claims, 7 Drawing Sheets

(56) References Cited

U.S. PATENT DOCUMENTS

| | | | |
|---|---|---|---|
| 2003/0179700 A1* | 9/2003 | Saleh et al. ................... | 370/216 |
| 2004/0196783 A1* | 10/2004 | Shinomiya .......... | H04L 41/0668 |
| | | | 370/216 |
| 2006/0203720 A1* | 9/2006 | Kano ............................ | 370/228 |
| 2006/0239291 A1* | 10/2006 | Birchler et al. .............. | 370/437 |
| 2009/0141656 A1* | 6/2009 | Fan ................... | H04L 29/12009 |
| | | | 370/254 |
| 2012/0201139 A1* | 8/2012 | Wiley et al. ................. | 370/235 |

\* cited by examiner

METHOD AND APPARATUS FOR ESTABLISHING ROUTING PATH IN MULTI-HOP NETWORK

CROSS-REFERENCE TO RELATED APPLICATIONS

This is a continuation of International Application No. PCT/KR2011/005105 filed on Jul. 12, 2011, which claims priority to Korean Application No. 10-2010-0066696 filed on Jul. 12, 2010, which applications are incorporated herein by reference.

TECHNICAL FIELD

The present invention relates to a method and apparatus for establishing a routing path in a multi-hop network and, more particularly, to a method and apparatus for establishing a routing path in a multi-hop network in the event of a communication problem.

BACKGROUND ART

Multi-hop routing technology in a network composed of a plurality of communication devices (nodes) is intended to ensure a transmission path from a departure point to a destination in order to transmit data. Since a communication problem-causing element, such as jamming, interrupts the communication of nodes within a predetermined range over a network, a transmission path cannot fulfill its role of transferring data normally when the nodes are included in the transmission path.

Figure 1:
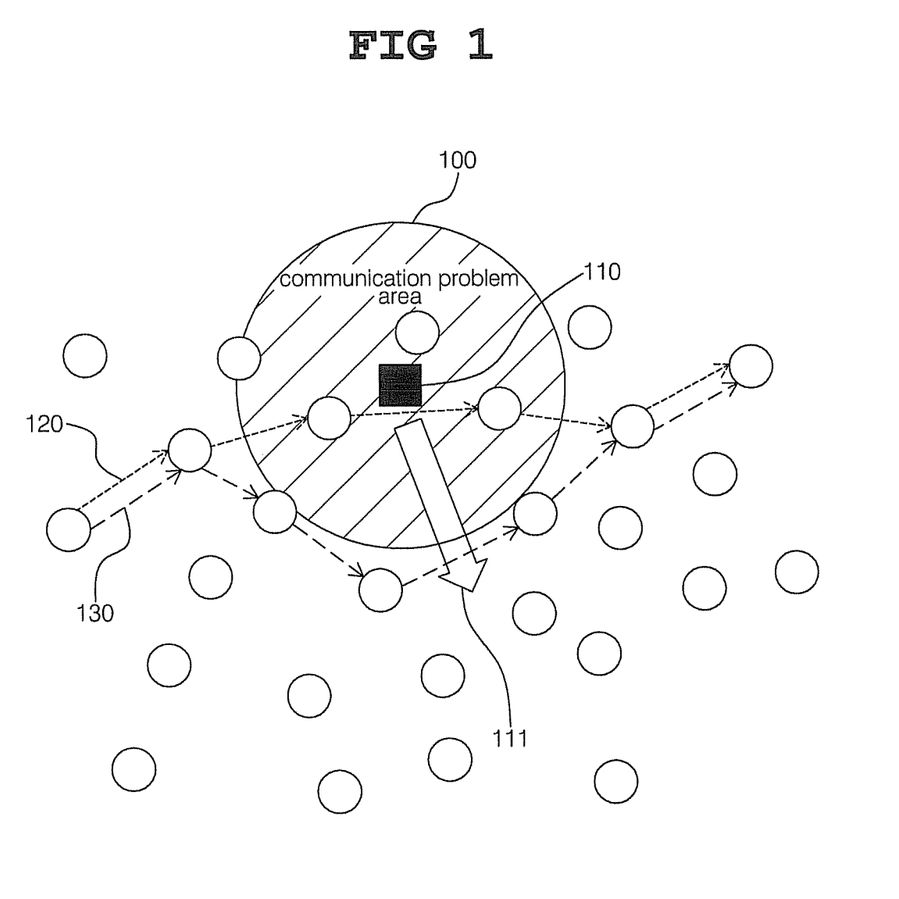
FIG. 1 is a conceptual diagram illustrating a conventional method of establishing a routing path in a multi-hop network in the event of a communication problem.

FIG. 1 is a conceptual diagram illustrating a conventional method of establishing a routing path in a multi-hop network in the event of a communication problem.

In FIG. 1, a routing path 120 that was established before the occurrence of a communication problem is illustrated.

A communication problem area 100 formed by a jammer 110, that is, a communication problem-causing element, is illustrated, and the direction of movement 111 of the jammer 110, that is, a communication problem-causing element, is also illustrated.

As shown in FIG. 1, in a multi-hop network, when a preset routing path experiences a communication problem, it is determined that some nodes included in the routing path experience the communication problem through the exchange of control messages on a routing protocol, and thus a new routing path is established. Here, a node that is experiencing a communication problem is automatically excluded from a routing path because the node does not receive a control message from a neighboring node. That is, a new routing path is established using normal nodes after the passage of a predetermined time in accordance with the operating rules of a predetermined routing protocol, and therefore normal data exchange can be performed between a departure node and a destination node.

However, the damage is not confined to the temporary interruption of data transmission, and the situation becomes more serious because the newly established routing path will not play its role again in a network in which the communication problem-causing element has mobility or there is the mobility of nodes. The reason for this is that a link and nodes that are affected by the communication problem-causing element continuously vary in the mobile environment.

In FIG. 1, the routing path 130 that has been automatically reestablished so that the nodes that are experiencing the communication problem can be avoided is illustrated. As can be seen from FIG. 1, although the routing path 130 is currently set as a path along which communication is possible, it can be easily expected in light of the direction of movement 111 of the jammer 110 that the reestablished routing path 130 will belong to the communication problem area 100 and thus cannot play its role.

The repeated destruction of such routing paths brings about the phenomenon of the interruption of data transmission, thereby resulting in a considerable decrease in the data rate and in great damage to the operation of an application requiring real-time capability.

SUMMARY

Accordingly, an object of the present invention is to provide a method and apparatus that determine a path that is expected to experience a communication problem based on the approaching characteristics of a communication problem-causing element, and adaptively establish a reliable routing path.

The above object can be achieved by a method of establishing a routing path in a multi-hop network, including the steps of (a) transmitting, by a node that has determined that there is a communication problem, a notification message associated with the communication problem to neighboring nodes within a range of a predetermined number of hops; (b) deriving, by each of the nodes that has received the notification message associated with the communication problem from the node, approaching characteristics of a communication problem-causing element from the notification message; and (c) reestablishing a routing path based on the approaching characteristics of the communication problem-causing element.

Here, the step (c) may include the step of assessing a level of risk of the communication problem of each of the nodes based on the approaching characteristics of the communication problem-causing element; and the step of reestablishing a routing path while taking into consideration the level of risk of the communication problem of each of the nodes.

Furthermore, the approaching characteristics of the communication problem-causing element may include the approaching direction and speed of the communication problem-causing element.

Here, the approaching direction of the communication problem-causing element may be obtained based on the location of the node that has transmitted the notification message or an increase or a decrease in the number of hops to the corresponding node over time.

Furthermore, the step of assessing the level of risk of the communication problem of each of the nodes may include assessing as higher the level of risk of the communication problem of a node having received the notification message and a node located in a direction of movement of the communication problem-causing element.

Furthermore, each of the nodes may assess the level of risk as higher when the approaching speed of the communication problem-causing element is higher.

Moreover, the range of the predetermined number of hops within which the notification message associated with the communication problem is transmitted at step (a) may vary depending on the approaching characteristics of the communication problem-causing element.

Meanwhile, the above object may be achieved by an apparatus for establishing a routing path in a multi-hop network, including a transmission and reception unit configured to transmit and receive a notification message associated with a communication problem; an approaching characteristic derivation unit configured to derive approaching characteristics of a communication problem-causing element from the notification message; a risk assessment unit configured to assess a level of risk of the communication problem based on the approaching characteristics of the communication problem-causing element; and a routing path establishment unit configured to derive an optimum routing path from overall node information into which the level of risk of the communication problem has been incorporated from other nodes, and to reestablish a routing path.

Here, the apparatus may further include a communication problem determination unit configured to determine whether the apparatus is located in a communication problem area, and to, if it is determined that the apparatus is located in the communication problem area, generate a notification message associated with the communication problem and transmitting the notification message to neighboring nodes via the transmission and reception unit.

As described above, in accordance with the present invention, it is possible to determine a path that is expected to experience a communication problem based on the approaching characteristics of a communication problem-causing element and to adaptively establish a reliable routing path.

DETAILED DESCRIPTION

The above object can be achieved by a method of establishing a routing path in a multi-hop network, including the steps of (a) transmitting, by a node that has determined that there is a communication problem, a notification message associated with the communication problem to neighboring nodes within a range of a predetermined number of hops; (b) deriving, by each of the nodes that has received the notification message associated with the communication problem from the node, approaching characteristics of a communication problem-causing element from the notification message; and (c) reestablishing a routing path based on the approaching characteristics of the communication problem-causing element.

Here, the step (c) may include the step of assessing a level of risk of the communication problem of each of the nodes based on the approaching characteristics of the communication problem-causing element; and the step of reestablishing a routing path while taking into consideration the level of risk of the communication problem of each of the nodes.

Furthermore, the approaching characteristics of the communication problem-causing element may include the approaching direction and speed of the communication problem-causing element.

Here, the approaching direction of the communication problem-causing element may be obtained based on the location of the node that has transmitted the notification message or an increase or a decrease in the number of hops to the corresponding node over time.

Furthermore, the step of assessing the level of risk of the communication problem of each of the nodes may include assessing as higher the level of risk of the communication problem of a node having received the notification message and a node located in a direction of movement of the communication problem-causing element.

Furthermore, each of the nodes may assess the level of risk as higher when the approaching speed of the communication problem-causing element is higher.

Moreover, the range of the predetermined number of hops within which the notification message associated with the communication problem is transmitted at step (a) may vary depending on the approaching characteristics of the communication problem-causing element.

Meanwhile, the above object may be achieved by an apparatus for establishing a routing path in a multi-hop network, including a transmission and reception unit configured to transmit and receive a notification message associated with a communication problem; an approaching characteristic derivation unit configured to derive approaching characteristics of a communication problem-causing element from the notification message; a risk assessment unit configured to assess a level of risk of the communication problem based on the approaching characteristics of the communication problem-causing element; and a routing path establishment unit configured to derive an optimum routing path from overall node information into which the level of risk of the communication problem has been incorporated from other nodes, and to reestablish a routing path.

Here, the apparatus may further include a communication problem determination unit configured to determine whether the apparatus is located in a communication problem area, and to, if it is determined, that the apparatus is located in the communication problem area, generate a notification message associated with the communication problem and transmitting the notification message to neighboring nodes via the transmission and reception unit.

Embodiments of the present invention will be described with reference to the drawings below.

Figure 2:
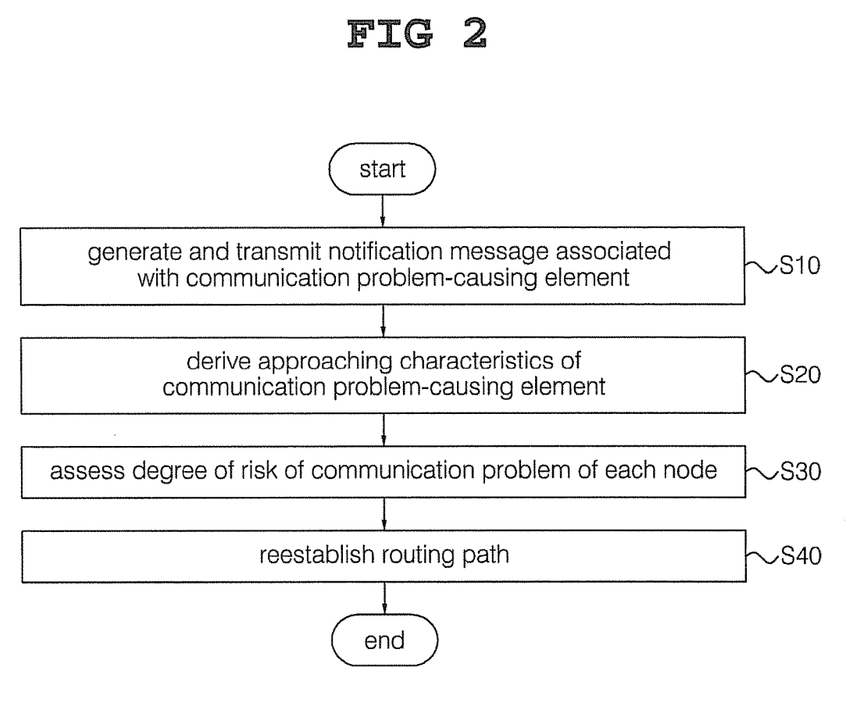
FIG. 2 is a flowchart schematically illustrating a method of establishing a routing path in a multi-hop network in accordance with an embodiment of the present invention.

FIG. 2 is a flowchart schematically illustrating a method of establishing a routing path in a multi-hop network in accordance with an embodiment of the present invention.

Referring to FIG. 2, the method of establishing a routing path in accordance with the present invention basically includes four steps, that is, step S10 of determining a communication problem and transmitting a notification message associated with the communication problem, step S20 of deriving the approaching characteristics of the communication problem-causing element from the notification message, step S30 of assessing the level of risk of the communication problem of each node, and step S40 of reestablishing a routing path while taking into consideration the levels of risk.

Each of the steps will be more specifically described with reference to FIGS. 3 to 5.

Figure 3:
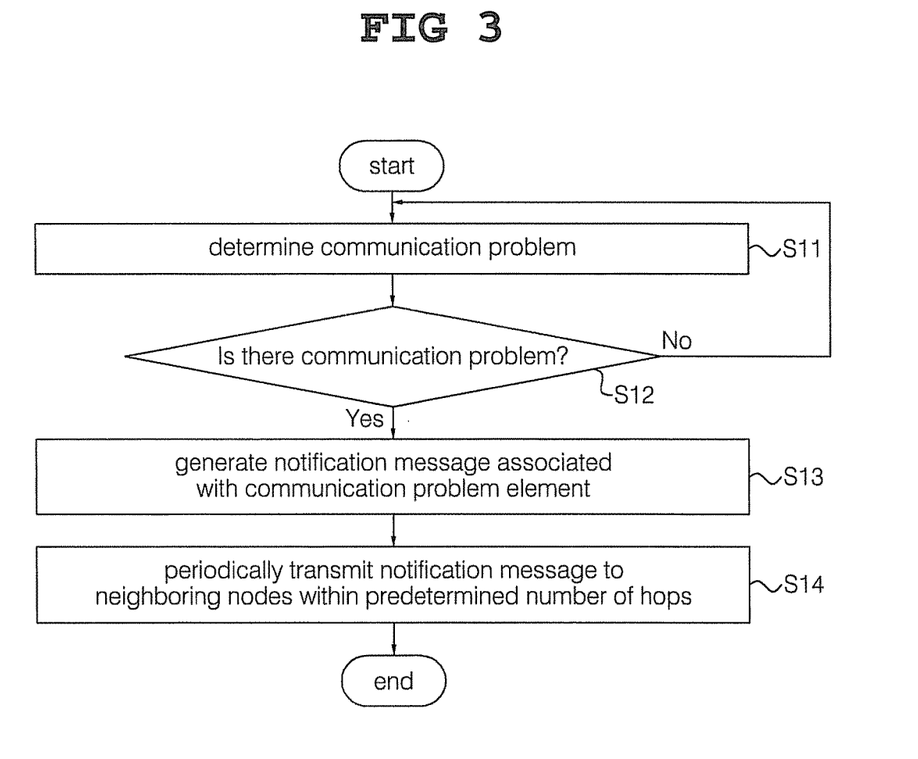
FIG. 3 is a flowchart illustrating a mechanism that determines a communication problem and transmits a notification message associated with the communication problem.
Figure 4:
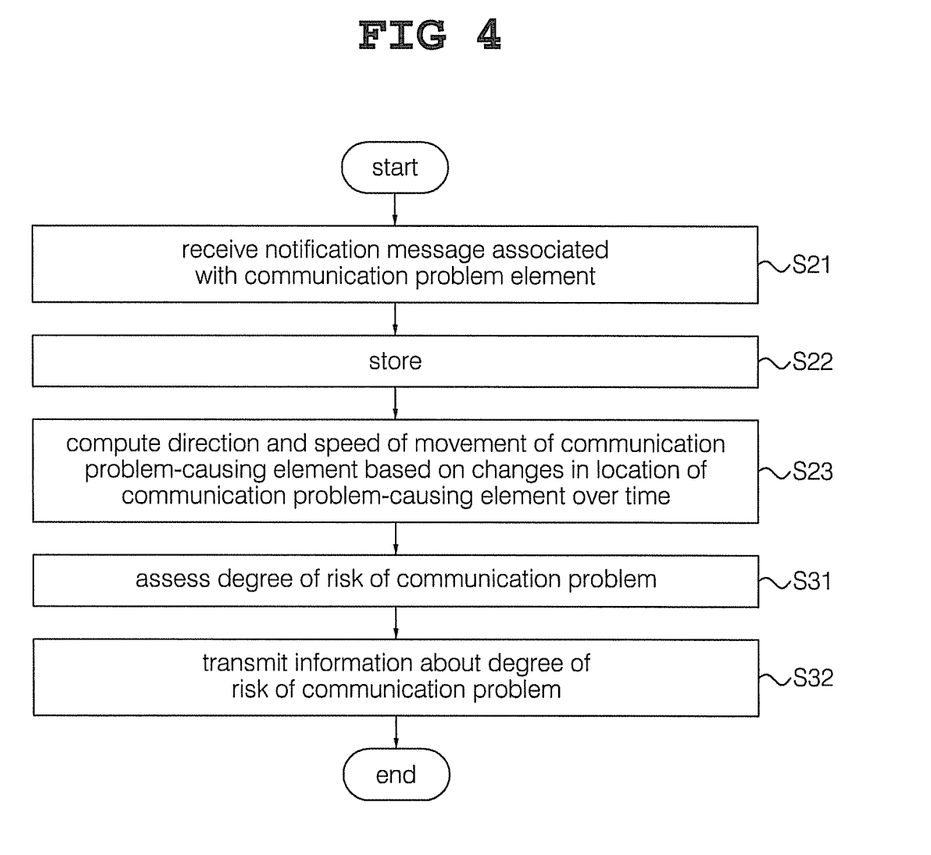
FIG. 4 is a flowchart illustrating a method of deriving the approaching characteristics of a communication problem-causing element and assessing the level of risk of each node.
Figure 5:
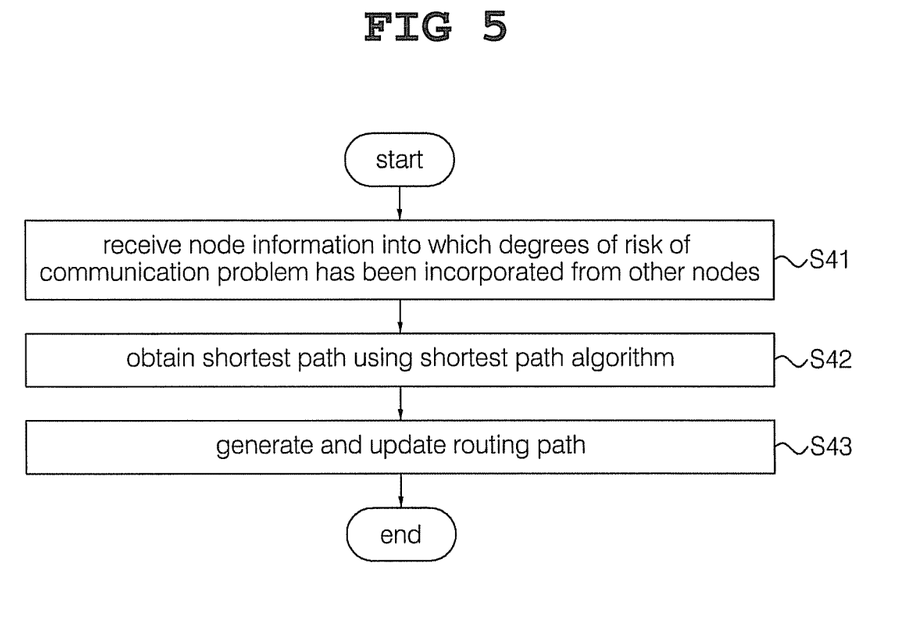
FIG. 5 is a flowchart illustrating a method of reestablishing a routing path while taking into consideration the levels of risk of the communication problem.

FIG. 3 is a flowchart illustrating a mechanism that determines a communication problem and transmits a notification message associated with a communication problem, FIG. 4 is a flowchart illustrating a method of deriving the approaching characteristics of a communication problem-causing element and assessing the level of risk of each node, and FIG. 5 is a flowchart illustrating a method of reestablishing a routing path while taking into consideration the levels of risk of the communication problem.

First, referring to FIG. 3, a method of determining a communication problem and transmitting a notification message will be described.

Each node determines whether it is located in a communication problem area at step S11. Whether the node is experiencing a communication problem may be determined based on a variety of criteria. For example, packet transfer rate and the strength of a signal are detected at the receiving end of the node, and it may be determined that the node is experiencing a communication problem if the packet transfer rate is low and the strength of the signal compared with a noise level is high. Here, the packet transfer rate is detected at a receiving node, and refers to the rate of packets that have been successfully received.

If it is determined that the node is experiencing a communication problem at step S12, the corresponding node generates a notification message associated with the communication problem at step S13. Here, the notification message associated with the communication problem may include the ID of the node and the time. This enables neighboring nodes that have received the notification message associated with the communication problem to determine approaching characteristics such as the location and direction of a communication problem-causing element.

The node located in the communication problem area transmits a notification message containing the ID of the node and the time to neighboring nodes within the range of a predetermined number of hops at step S14. Although the nodes within the communication problem area cannot receive data, they can transmit data, and thus the nodes within the communication problem area may periodically transmit a notification message associated with the communication problem to the neighboring nodes. Such a notification message associated with a communication problem is repeatedly transmitted to neighboring nodes at predetermined intervals while the communication problem continues.

In this case, the range, that is, the number of hops, within which the notification message associated with the communication problem is transmitted may vary depending on the approaching characteristics of the communication problem-causing element.

As a first example, consider the case in which the basic range of transmission of a notification message is set to two hops. The case in which it is determined that a node is located in a communication problem area in the state in which no notification message has been received from the neighborhood may be considered. This node transmits a notification message to neighboring nodes within the range of two hops, which is the basic range of transmission of a notification message.

As a second example, the case in which a node is currently located in a communication problem area and there is a record of receiving a notification message associated with a communication problem when the node could receive data may be considered. This node may determine that it is located in the direction of movement of a communication problem-causing element, and may increase the range of transmission of a notification message. For example, the range of transmission may be set not to the basic two hops, but to three or four hops. As described above, the node located in the direction of movement of the communication problem-causing element increases the range of transmission of the notification message and thus notifies the nodes that are located farther and that still have a high possibility of experiencing the communication problem of the risk, thereby increasing the cost for the level of risk of the node and then allowing the cost to be taken into consideration when the establishment of routing is performed.

As a third example, if the approaching speed of the communication problem has exceeded a predetermined value, the range of transmission of the notification message may be further increased. Here, the approaching speed of the communication problem may be determined by analyzing one or more received notification messages, and the time at which a node will be located within a communication problem area may be estimated based on the approaching direction and speed. The current approaching speed may be determined by comparing such estimated data with actual data. Besides the above-described examples, a node that has determined a communication problem may set the range of transmission of a notification message associated with the communication problem in various ways.

A method of obtaining the approaching characteristics of a communication problem-causing element and assessing the level of risk will be described with reference to FIG. 4.

Each node that has received a notification message related to a communication problem-causing element from a neighboring node at step S21 stores the content of the notification message at step S22. As described above, the notification message related to the communication problem-causing element includes the ID of the node and the time. When a proactive routing-based (table-based) scheme is not employed and thus the number of hops to each node is not known, the node records the number of hops from the node that transmitted the notification message. As another example, location information, other than the number of hops, may be recorded and then used to measure the distance.

Each node that has received and stored the notification message derives the approaching characteristics of the communication problem-causing element, for example, the approaching direction and speed of the communication problem-causing element, from the content of the message at step S23.

The approaching direction of the communication problem-causing element may be determined based on variations in the location of the communication problem-causing element over time, that is, increases or decreases in the distance (the number of hops) from the communication problem-causing element. For example, if the number of hops decreases compared to a previous record, it may be determined that the communication problem-causing element approaches a node in question. In contrast, if the number of hops increase, it may be determined that the communication problem-causing element moves away from the node in question.

The approaching speed of the communication problem-causing element may be derived from time variations in the distance from the communication problem-causing element. For example, if time variations in the distance from the communication problem-causing element are high, it may be determined that the communication problem-causing element approaches the node in question at high speed.

The above determination of the approaching speed and direction of the communication problem-causing element is performed using a history-based method. The node that is located within the communication problem area periodically transmits a notification message related to the communication problem-causing element, while nodes that have received the notification message record the time that is included in the notification message and the location of (or the number of hops from) the node that has transmitted the notification message.

When the communication problem-causing element moves, the node that transmits the notification message associated with the communication problem changes. For example, when the communication problem-causing element approaches, nodes within an area near the approaching communication problem-causing element transmit notification messages. The approaching speed and direction may be derived from the above varying characteristic. That is, if the distances from nodes that transmit notification messages decrease, the direction of movement of the communication problem-causing element is oriented to a node in question. Meanwhile, if time variations in distance are high, it may be determined that the speed of movement is high.

The estimated level of risk of a communication problem is assessed based on the derived approaching direction and speed of the communication problem-causing element at step S31.

The conventional establishment of a routing path for transmitting data between a departure point and a destination is performed by computing the sums of the costs of links or nodes included in paths and then selecting a path with the least cost sum. The conventional method determines the cost of each node or the cost of each link connected to a node to be 1, whereas the present invention computes the level of risk of the communication problem of each node, that is, the link cost or node cost, while taking into consideration the location and approaching characteristics of a communication problem-causing element.

In a method of assessing the level of risk of a communication problem at each node, a cost value is in proportion to the level of risk of the communication problem in principle.

For example, the cost of a node located in the direction of movement of a communication problem-causing element is determined to be higher than that of a node located in another direction and at the same distance from the communication problem-causing element. Furthermore, the cost is in proportion to the approaching speed of the communication problem-causing element.

Each node includes information about the assessed level of risk of the communication problem in node information and transmits the node information to neighboring nodes at step S32. The node may share the cost information with neighboring nodes using a Hello message that is periodically transmitted to the neighboring nodes in the conventional method.

A method of reestablishing a routing path based on the level of risk of the communication problem will be described with reference to FIG. 5.

In general, each node includes information about its neighboring nodes, including costs, in a control message, and periodically transmits the information over the overall network. In a conventional OLSR routing algorithm, a node, such as a cluster head, called an MPR transmits a control message on behalf of neighboring nodes, thereby reducing the overhead of control messages. Furthermore, each node becomes aware of information about neighboring nodes via a Hello message that is periodically transmitted to one-hop nodes.

When each node receives control messages, including information about the levels of risk of the communication problem, from other nodes of a network at step S41, the node can become aware of information about all of the nodes, including costs (that is, the levels of risk of the communication problem), in which case the shortest paths from all of the nodes are obtained using a shortest path algorithm, such as the Dijksta algorithm, and a routing table is generated and updated at step S43. In the routing table, a list of all nodes and information about neighboring nodes for the shortest paths to respective nodes are recorded.

As described above, the present invention may incorporate the level of risk of a communication problem into the assessment of each node and thus ensure a reliable routing path.

Figure 6:
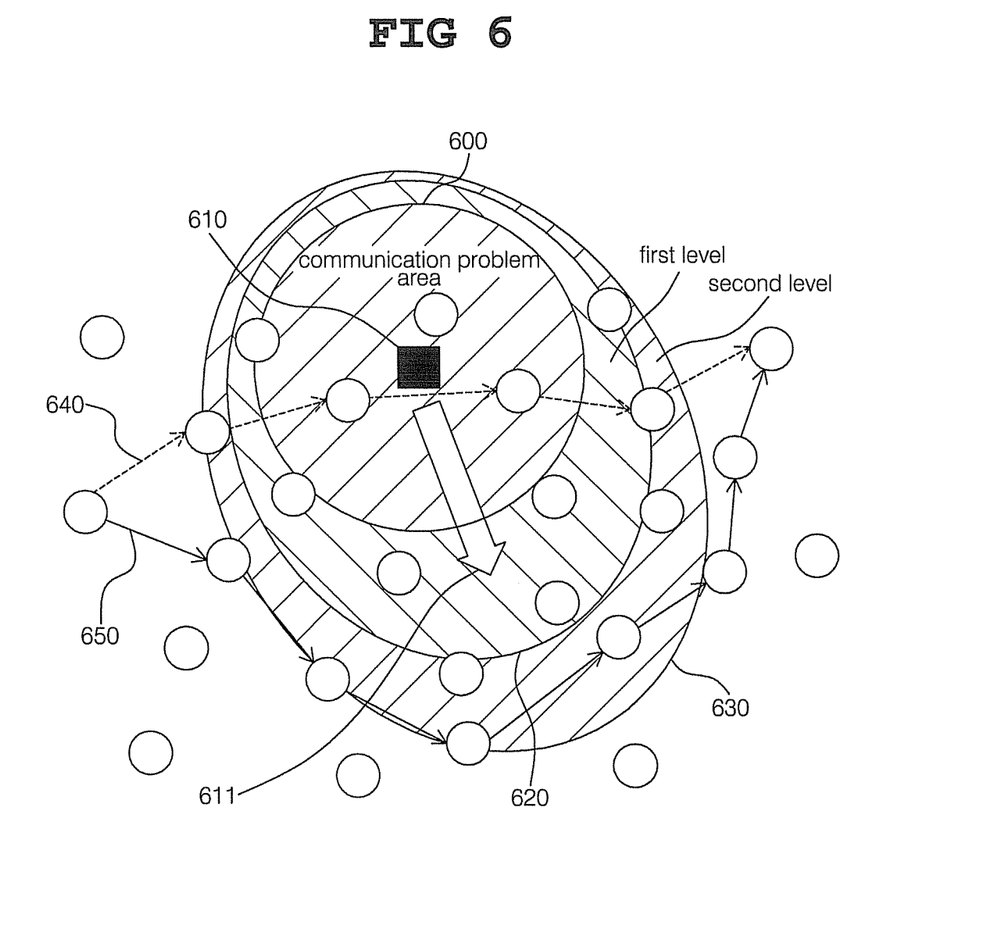
FIG. 6 shows an example of a method of reestablishing a routing path using the method of establishing a routing path in a multi-hop network in accordance with the present invention.

FIG. 6 shows an example of a method of reestablishing a routing path using the above-described method of establishing a routing path in a multi-hop network in accordance with the present invention.

In FIG. 6, a routing path 640 established before the occurrence of a communication problem, a jammer 610, that is, a communication problem-causing element, and a communication problem area 600 formed by the jammer 610 are shown. Furthermore, the direction of movement 611 of the jammer 610, which is a communication problem-causing element, is depicted.

Each node included in a communication problem area 600 generates a notification message associated with a communication problem and transmits the notification message to neighboring nodes within a predetermined range. In this case, each node may determine the direction of movement and speed of the communication problem-causing element based on previous records, and increase the range within which the notification message will be transmitted based on the determined information. For example, in FIG. 6, a node located in the direction of movement of the communication problem-causing element may differently set the range of transmission so that the notification message associated with the communication problem can be transmitted to a node that is located outside of the basic range of transmission.

For example, the levels of risk of the communication problem of nodes that have received the notification message associated with the communication problem-causing element are assessed as higher first, and the range of nodes located in the direction of movement of the communication problem-causing element may be increased.

Meanwhile, as shown in FIG. 6, the estimated levels of risk of the communication problem may be assessed as different depending on the varying characteristics (the direction of movement and the speed) 611 of the jammer 610.

An estimated communication problem risk area may be indicated as a first-level risk area 620, or a second-level risk area 630. The levels of risk of the communication problem of nodes included in the estimated communication problem risk area are assessed as higher. It can be seen that the levels of risk of nodes located in the direction of movement 611 of the jammer 610 are assessed as higher, and it can be also seen that the level of risk of the communication problem in the first-level risk area 620 is higher than that of the second-level risk area 630.

A reestablished routing path 650 is illustrated based on node information into which the levels of risk of the communication problem have been incorporated.

Comparing FIG. 6 with FIG. 1, it can be easily estimated in FIG. 1 that the reestablished routing path is also faced with an imminent communication problem because a node located in an area faced with the imminent communication problem is included in the reestablished routing path. In contrast, it is easily estimated in FIG. 6 that the reestablished routing path has a weak possibility of experiencing a communication problem currently or in the future because the levels of risk of the communication problem have been incorporated into the reestablished routing path.

Moreover, it can be easily estimated that in FIG. 6, although the reestablished routing path is faced with an imminent communication problem, the routing path is reset to another reliable path before the routing path starts to experience a communication problem because the level of risk of the communication problem that is, the cost, of each node is continuously updated as the jammer moves.

Figure 7:
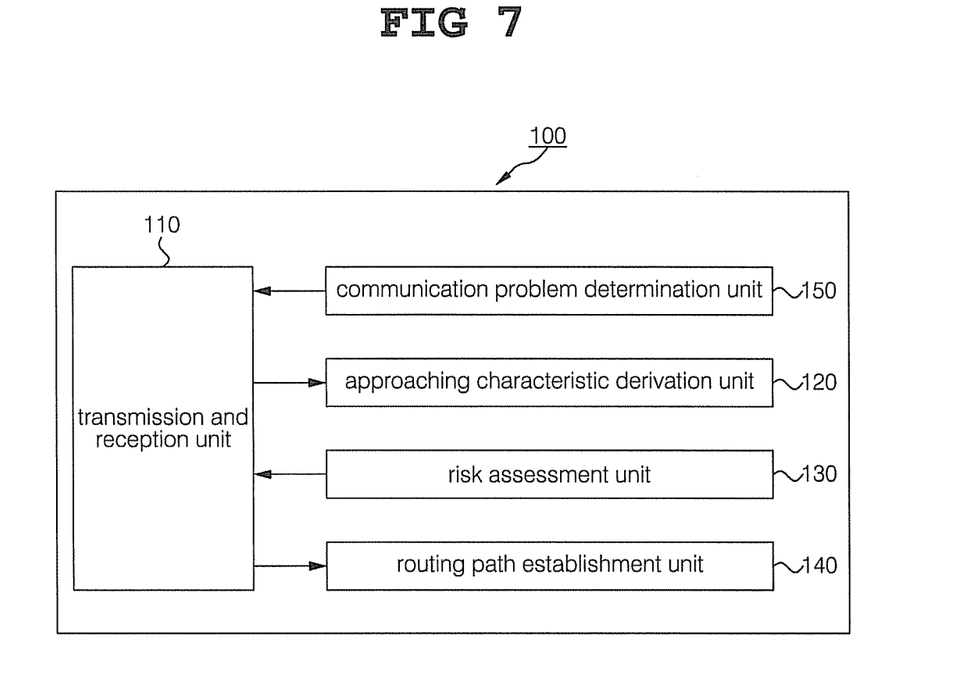
FIG. 7 is a conceptual diagram illustrating apparatus for establishing a routing path using the method of establishing a routing path in a multi-hop network.

FIG. 7 is a conceptual diagram illustrating an apparatus for establishing a routing path using the above-described method of establishing a routing path in a multi-hop network.

Referring to FIG. 7, the apparatus 100 for establishing a routing path in accordance with this embodiment includes a transmission and reception unit 110, an approaching characteristic derivation unit 120, a risk assessment unit 130, and a routing path establishment unit 140.

The transmission and reception unit 110 is configured to exchange data with other nodes, and may be implemented in various ways depending on applied protocols. The transmission and reception unit 110 may transmit and receive a notification message associated with a communication problem, node information, etc.

The approaching characteristic derivation unit 120 is configured to derive the approaching characteristics of a communication problem-causing element from a notification message associated with the communication problem received from a neighboring node, and obtains the approaching direction and speed, etc. of a communication problem-causing element by analyzing node and time information included in the notification message over time. Although not shown in FIG. 7, the apparatus includes memory that is capable of storing data, etc. A received notification message is recorded in the memory.

The risk assessment unit 130 is configured to assess the level of risk of the communication problem of a node in question based on the approaching direction and speed of the communication problem-causing element obtained by the approaching characteristic derivation unit 120. As described above, the level of risk is assessed as higher when the node is located in the approaching direction of the communication problem-causing element or in proportion to the speed. The assessed level of risk of the communication problem is included in node information and sent to neighboring nodes.

The routing path establishment unit 140 derives an optimum routing path from information about all nodes into which the levels of risk of the communication problem received using the transmission and reception unit 110 have been incorporated, and then reestablishes a routing path. In this case, various shortest path algorithms may be employed.

As shown in FIG. 7, this apparatus may further include a communication problem determination unit 150. The communication problem determination unit 150 determines whether this apparatus is located within a communication problem area, and, if it is determined that this apparatus is located in the communication problem area, generates a notification message associated with a communication problem and transmits the notification message to neighboring nodes via the transmission and reception unit 110. This enables the neighboring nodes to determine the location, approaching characteristics, etc. of the communication problem-causing element.

The present invention is configured to select a routing path while avoiding a communication problem-causing element in a mobile environment in which the communication problem-causing element is or will be present currently or in the future, thereby minimizing the possibility of losing data and also increasing the data transfer rate. Furthermore, the present invention enables continuous and reliable data transmission without the phenomenon of the interruption of data transmission attributable to a repetitive problem with a routing path.

Furthermore, the present invention enables reliable data transmission against a varying communication problem-causing element, even in communication between stationary devices, and enables reliable and real-time exchange of information in a situation in which there is a hostile jamming attack upon communication between mobile tactical communication devices, particularly over a military tactical network.

Moreover, the present invention is configured to transmit data along a path that is rarely affected by a communication problem-causing element in multi-hop communication between moving vehicles, thereby reducing the loss of data and ensuring reliable communication.

Although some embodiments of the present invention have been illustrated and described, it will be apparent to those having ordinary knowledge in the technical field to which the present invention pertains that variations and modifications are possible to the embodiments without departing from the principle or spirit of the present invention. The scope of the present invention will be defined based on the following claims and the equivalents thereof.

The present invention relates to a method and apparatus for establishing a routing path in a multi-hop network, and the method of establishing a routing path in a multi-hop network in accordance with the present invention includes the steps of (a) transmitting, by a node that has determined that there is a communication problem, a notification message associated with the communication problem to neighboring nodes within a range of a predetermined number of hops; (b) deriving, by each of the nodes that has received the notification message associated with the communication problem from the node, approaching characteristics of a communication problem-causing element from the notification message; and (c) reestablishing a routing path based on the approaching characteristics of the communication problem-causing element.

As a result, it is possible to determine a path that is expected to experience a communication problem based on the approaching characteristics of a communication problem-causing element and to adaptively establish a reliable routing path.

The invention claimed is:

1. A method of establishing a routing path in a multi-hop network, comprising the steps of:
   (a) transmitting, by a node that has determined that there is a communication problem, a notification message associated with the communication problem affected by a location and a movement of a communication problem-causing element to neighboring nodes within a range of a predetermined number of hops;
   (b) deriving, by each of the neighboring nodes that has received from the node the notification message associated with the communication problem, respective approaching characteristics of the communication problem-causing element relative to the each of the neighboring nodes based on the notification message and a record of a previous reception of the notification message, wherein the respective approaching characteristics of the communication problem-causing element comprise an approaching direction of the communication problem-causing element; and (c) establishing a routing path based on the approaching characteristics of the communication problem-causing element, wherein the range of the predetermined number of hops, the notification message associated with the communication problem to neighboring nodes therewithin, is determined based on the respective approaching characteristics of the communication problem-causing element and based on the notification message and a record of a previous reception of the notification message.

2. The method of claim 1, wherein the step (c) comprises the steps of: assessing a level of risk of the communication problem for each of nodes based on the approaching characteristics of the communication problem-causing element; and reestablishing a routing path by taking into consideration the level of risk.

3. The method of claim 1, wherein the approaching characteristics of the communication problem-causing element comprise moving speed of the communication problem-causing element.

4. The method of claim 3, wherein the approaching direction of the communication problem-causing element is obtained based on a location of the node that has transmitted the notification message or an increase or a decrease in a number of hops to the node that has transmitted the notification message over time.

5. The method of claim 2, wherein the step of assessing a level of risk of the communication problem for each of nodes comprises assessing the level of risk of the communication problem of a node to be high if the node has received the notification message or if the node is located in a direction of movement of the communication problem-causing element.

6. The method of claim 5, wherein the level of risk for one node is assessed to be higher than the other node if approaching speed of the communication problem-causing element of the node is higher than the other node.

7. The method of claim 1, wherein the range of the predetermined number of hops within which the notification message associated with the communication problem is transmitted at step (a) varies depending on the approaching characteristics of the communication problem-causing element.

8. A communication device for establishing a routing path in a multi-hop network, comprising:
    a transceiver configured to transmit and receive a notification message associated with a communication problem affected by a location and a movement of a communication problem-causing element;
    a router configured to:
        derive approaching characteristics of the communication problem-causing element based on the notification message and a record of a previous reception of the notification message, wherein the respective approaching characteristics of the communication problem-causing element comprise an approaching direction of the communication problem-causing element;
        assess a level of risk of the communication problem based on the approaching characteristics of the communication problem-causing element relative to the communication device; and
        establish a routing path by deriving an optimum routing path on the basis of the assessed level of risk,
    wherein the transceiver is further configured to determine a range of a predetermined number of hops, the notification message associated with the communication problem to neighboring nodes therewithin, to transmit the notification message based on the respective approaching characteristics of the communication problem-causing element and based on the notification message and a record of a previous reception of the notification message.

9. The device of claim 8, the router further configured to determine whether the device is located in a communication problem area, and to, if it is determined that the device is located in the communication problem area, generate a notification message associated with the communication problem and transmitting the notification message to neighboring nodes via the transceiver.

* * * * *